United States Patent

Duvall

[15] 3,690,582
[45] Sept. 12, 1972

[54] FILM CARTRIDGE
[72] Inventor: Harvey H. Duvall, 39441 Van Dyke- Apt. 208, Sterling Heights, Mich. 48078
[22] Filed: Nov. 12, 1970
[21] Appl. No.: 88,710

[52] U.S. Cl.................................242/71.1, 242/195
[51] Int. Cl..........................G03b 1/04, G11b 15/32
[58] Field of Search......................242/71.1, 195–200

[56] References Cited
UNITED STATES PATENTS
1,996,782  4/1935  Wood........................242/71.1
2,172,255  9/1939  Nagel........................242/71.1

*Primary Examiner*—Leonard D. Christian
*Attorney*—Barnes, Kisselle, Raisch & Choate

[57] ABSTRACT

A film cartridge comprising a housing with a spool rotatably mounted therein and film wound upon the spool. The end of the film extends through a slot in the housing to the exterior and a tab or tabs are struck upwardly or downwardly from the film. When the film is rewound on the cartridge, the tab or tabs engage the housing to prevent the end of the film from being wound upon the spool.

9 Claims, 2 Drawing Figures

PATENTED SEP 12 1972 3,690,582

INVENTOR
Harvey H. Duvall
BY
Barnes, Kisselle, Raisch & Choate
ATTORNEYS

FILM CARTRIDGE

This invention relates to film cartridges.

BACKGROUND OF THE INVENTION

In film cartridges such as utilized for handling 35mm film, the cartridge comprises a housing with closed ends in which a spool is rotatably mounted. The film is wound on the spool and the end of the film extends outwardly through a slot in the housing to the exterior. In using the film, the film is progressively advanced out of the cartridge. When substantially the entire length of film has been exposed, the film is rewound in the cartridge. When the film is wound within the cartridge, there is a possibility of light leakage through the slot through which the film is passed. In addition, the cartridge must be broken in order to remove the film for processing.

Among the objects of the invention are to provide a film cartridge wherein a portion of the film always remains exteriorly of the cartridge so that light leakage is prevented and so that the film can be loaded into processing equipment without destroying the cartridge. This will result in reduced processing costs.

SUMMARY OF THE INVENTION

A film cartridge comprising a housing with a spool rotatably mounted therein and film wound upon the spool. The end of the film extends through a slot in the housing to the exterior and a tab or tabs are struck upwardly or downwardly from the film. When the film is rewound on the cartridge, the tab engages the housing to prevent the end of the film from being wound upon the spool. In this manner, a portion of the end of the film is always maintained exteriorly of the cartridge preventing any light leakage through the slot of the housing and, in addition, making the film readily accessible for processing without destroying the cartridge.

DESCRIPTION

Figures 1, 2:
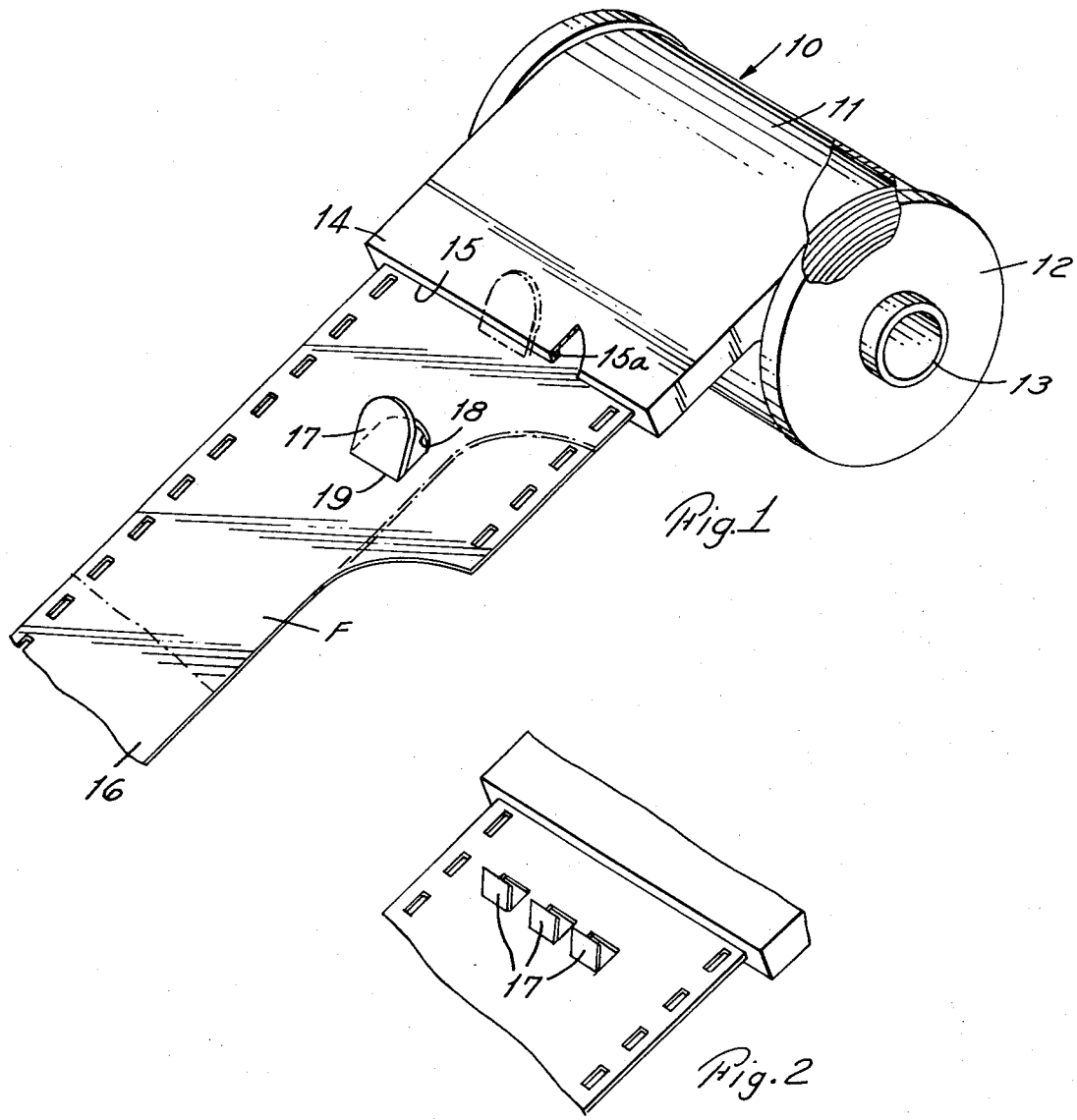
FIG. 1 is a part sectional perspective view of the cartridge embodying the invention.
FIG. 2 is a similar view of a modified form of the invention.

Referring to the single figure of the drawings, the film cartridge 10 embodying the invention comprises a cylindrical housing 11 having end caps 12 thereon and a spool 13 rotatably mounted within the housing and having ends projecting outwardly in accordance with conventional construction. The cartridge further includes a tangential portion 14 having a slot 15 therein through which the film F passes. The film is wound on the spool 13 and the end 16 of the film which is narrower in width projects outwardly therefrom. An integral tab 17 is formed by a U-shaped slit 18 which is connected by a straight portion 19 to the film at the wide portion thereof and is struck outwardly from the plane of the film. The free end of the tab 17 extends toward the housing 16.

In use, the film cartridge is placed in the camera and the film is progressively fed outwardly and exposed in a conventional manner. When substantially the entire length of film has been exposed, the film is rewound into the cartridge in accordance with conventional practice and operation of the camera. The tab 17, however, will yieldingly project upwardly from the plane of the film and engage the end of the projection 14 to prevent the end of the film from entering the housing of the cartridge so that a portion of the widest part of the film fills the slot 15. This will insure that light leakage will not occur at the slot 15. Slot 15 is provided with a seal 15a of felt or velour in accordance with conventional cartridge construction. When the cartridge is received for processing, the end of the film can be readily grasped to withdraw the film without prying the ends off the cartridge. This will eliminate one operational step and will also permit loading into the processor in daylight. Obviously, both of these advantages will result in reduction of the processing costs.

In the form of the invention shown in FIG. 2, a plurality of square tabs 17' are struck outwardly from the film.

I claim:
1. A film cartridge comprising
   a housing having closed ends,
   a spool rotatably mounted within said housing,
   said housing having an opening in the side thereof through which film may extend,
   film wound on said spool and extending through said opening,
   and means on said film spaced from the end thereof normally positioned within said housing and permitting the film to be unwound to bring said means out of said housing and thereafter being operable to prevent the end of the film from being wound completely on said spool when the film is rewound.
2. The combination set forth in claim 1 wherein said last-mentioned means is operable to engage the housing.
3. The combination set forth in claim 2 wherein said housing has a tangential extension incorporating said opening.
4. The combination set forth in claim 1 wherein said last-mentioned means comprises a tab extending outwardly from said film.
5. The combination set forth in claim 4 wherein said tab is connected to the film at a portion spaced nearer the end of the film than the housing so that the tab extends rearwardly from the end of the film.
6. A film cartridge comprising
   a housing having closed ends,
   a spool rotatably mounted within said housing,
   said housing having an opening in the side thereof through which film may extend,
   film wound on said spool and extending through said opening,
   and means on said film adjacent the end thereof operable to prevent the end of the film from being wound completely on said spool comprising an integral tab struck outwardly from said film,
   said tab being connected to the film at a portion spaced nearer the end than the housing so that the tab extends rearwardly from the free end of the film.
7. The combination set forth in claim 6 wherein said tab is formed by a U-shaped slit in said film.
8. A film cartridge comprising
   a housing having closed ends, a spool rotatably mounted within said housing, said housing having an opening in the side thereof through which film may extend, film wound on said spool and extending through said opening, and means on said film adjacent the end thereof operable to prevent the end of the film from being wound completely on said spool, said last-mentioned means comprising a tab extending outwardly from said film, said tab being connected to the film at a portion spaced nearer the end of the film than the housing so that the tab extends rearwardly from the end of the film, said tab being integral with said film.

9. A film cartridge comprising a housing having closed ends, a spool rotatably mounted within said housing, said housing having an opening in the side thereof through which film may extend, film wound on said spool and extending through said opening, and means on said film adjacent the end thereof operable to prevent the end of the film from being wound completely on said spool, said last-mentioned means comprising a tab extending outwardly from said film, p1 said tab being formed by a U-shaped slit in said film.

* * * * *